United States Patent
Chaturvedi et al.

(10) Patent No.: US 9,038,029 B2
(45) Date of Patent: May 19, 2015

(54) THREE-DIMENSIONAL GUI OBJECT STORES IN AUTOMATION TEST TOOLS

(71) Applicant: International Business Machines Corporation, Armonk, NY (US)

(72) Inventors: Nitin Chaturvedi, Pune (IN); Varun K. Mishra, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/874,469

(22) Filed: Apr. 30, 2013

(65) Prior Publication Data

US 2013/0246952 A1 Sep. 19, 2013

Related U.S. Application Data

(63) Continuation of application No. 12/983,968, filed on Jan. 4, 2011.

(51) Int. Cl.
| | |
|---|---|
| *G06F 9/44* | (2006.01) |
| *G06F 15/177* | (2006.01) |
| *G06F 3/00* | (2006.01) |
| *G06F 3/0484* | (2013.01) |
| *G06F 11/36* | (2006.01) |

(52) U.S. Cl.
CPC ............ *G06F 3/0484* (2013.01); *G06F 11/368* (2013.01); *G06F 11/3688* (2013.01); *G06F 9/4435* (2013.01); *G06F 9/4443* (2013.01)

(58) Field of Classification Search
None
See application file for complete search history.

(56) References Cited

U.S. PATENT DOCUMENTS

| | | | | |
|---|---|---|---|---|
| 5,555,365 | A | * | 9/1996 | Selby et al. ................ 715/765 |
| 6,407,751 | B1 | * | 6/2002 | Minami et al. ............. 715/736 |
| 6,898,764 | B2 | | 5/2005 | Kemp |
| 7,536,648 | B1 | | 5/2009 | Zhao |
| 7,900,192 | B2 | * | 3/2011 | Patterson ................... 717/125 |
| 8,020,108 | B1 | * | 9/2011 | Roytman et al. ........... 715/762 |
| 8,244,775 | B1 | | 8/2012 | Bak et al. |
| 8,413,117 | B1 | * | 4/2013 | Coughlan et al. .......... 717/124 |
| 8,458,662 | B2 | * | 6/2013 | Grechanik et al. ......... 717/124 |

(Continued)

OTHER PUBLICATIONS

Mark Grechanik et al. "Maintaining and Evolving GUI-Directed Test Scripts" [Online], IEEE, 2009, pp. 1-11, [Retrieved from Internet on Jan. 7, 2015], <http://www.cs.uic.edu/~drmark/index_htm_files/Rest.pdf>.*

(Continued)

*Primary Examiner* — Thuy Dao
*Assistant Examiner* — Ziaul A Chowdhury
(74) *Attorney, Agent, or Firm* — North Shore Patents, P.C.; Michele Liu Baillie

(57) ABSTRACT

A method for storing graphical user interface (GUI) object properties includes: storing GUI object properties for each GUI object for a starting version of an application in an object map; associating the stored GUI object properties for each GUI object with a starting version identifier; determining that at least one of the GUI objects is changed; in response to determining that the at least one GUI object is changed, storing modifications of the GUI object properties for the at least one GUI object in the object map; and associating the modifications of the GUI object properties for the at least one GUI object with a new version identifier of the application. Over time, the object map contains multiple variants of the GUI objects. An automation test tool may use this object map to intelligently select appropriate GUI object version for recognition at script run time.

9 Claims, 4 Drawing Sheets

(56) References Cited

U.S. PATENT DOCUMENTS

| | | | |
|---|---|---|---|
| 8,527,950 B2* | 9/2013 | Berry et al. | 717/124 |
| 8,549,483 B1* | 10/2013 | Bridges et al. | 717/126 |
| 2003/0202012 A1 | 10/2003 | Kemp | |
| 2003/0236775 A1* | 12/2003 | Patterson | 707/3 |
| 2004/0264782 A1 | 12/2004 | McKnight et al. | |
| 2005/0204298 A1* | 9/2005 | Kemp | 715/762 |
| 2005/0257196 A1* | 11/2005 | Hollander et al. | 717/115 |
| 2005/0268285 A1* | 12/2005 | Bagley et al. | 717/124 |
| 2008/0098229 A1* | 4/2008 | Hartrell et al. | 713/176 |
| 2008/0133472 A1 | 6/2008 | Patterson | |
| 2008/0155515 A1 | 6/2008 | Stewart | |
| 2009/0049427 A1 | 2/2009 | Zhao | |
| 2009/0217302 A1 | 8/2009 | Grechanik et al. | |
| 2010/0042929 A1 | 2/2010 | Berry et al. | |
| 2010/0175050 A1* | 7/2010 | Wang et al. | 717/124 |
| 2011/0307864 A1* | 12/2011 | Grechanik et al. | 717/124 |

OTHER PUBLICATIONS

Erik Sjösten-Andersson et al. "Costs and Benefits of Structure-aware Capture/Replay tools" [Online], 2006, pp. 3-11, [Retrieved from Internet on Jan. 7, 2015], <http://syn.cs.umu.se/serps2006/SERPS06.pdf>.*

John Kent, "Test Automation From Record/Playback to Frameworks", [Online], 2007, pp. 1-17, [Retrieved from Internet on Jan. 7, 2015], <http://simplytesting.com/Downloads/Kent%20-%20From%20Rec-Playback%20To%20FrameworksV1.0.pdf>.*

Heila van der Merwe et al. "Verifying Android Applications using Java PathFinder", [Online], 2012, pp. 1-5, [Retrieved from Internet on Jan. 7, 2015], <http://delivery.acm.org/10.1145/2390000/2382797/p38-2-vandermerwe.pdf>.*

Fu, C. et al., "Inferring Types of References to GUI Objects in Test Scripts," 2009 International Conference on Software Testing Verification and Validation, IEEE 2009.

Agarwal, T., "A Descriptive Programming Based Approach for Test Automation", http://portal.acm.org/citation.cfm?id=1578847, Source CIMCA Proceedings of the 2008 International Conference on Computational Intelligence for Modelling Control and Automation; 2008; pp. 152-156.

Li, K. et al., "Effective GUI Test Automation: Developing an Automated GUI Testing Tool", SYBEX Sample Chapter, pp. 19-35, 2004.

"Guide to QuickTest Professional 10", http://www.qfp10.com/2009/04/versioning-and-baseline.html, Apr. 18, 2009.

Fitzgerald, K., "Version Control in QTP/QC10", http://www.softwaretestingclub.com/group/quicktestprofessional/forum/topics/version-control-in-qtpqc-10?xg_source=activity, Jan. 14, 2010.

* cited by examiner

THREE-DIMENSIONAL GUI OBJECT STORES IN AUTOMATION TEST TOOLS

CROSS-REFERENCE TO RELATED APPLICATIONS

The present application is a continuation of co-pending U.S. patent application Ser. No. 12/983,968, filed on Jan. 4, 2011.

BACKGROUND

In the process of software development, automation testing is an important and critical step in the testing cycle. Testing is necessary to ensure quality in the software. For present day automation testing tools, part of the testing cycle includes graphical user interface (GUI) object testing. GUI objects include icons, push buttons, drop down menus, etc. that a user of the program will use to interact with the software. GUI object testing is typically implemented via a record and playback approach, where interactions with GUI objects are recorded and then played back. Interactions include, for example, clicking on links, buttons, etc. and entering data into entry fields, check boxes, etc. The test tool records these user actions, together with a record of the individual GUI objects under test that were interacted with. The record and playback approach is an important feature of automation testing tools as it provides an easy way to create test scripts without requiring extensive knowledge of coding and development.

To achieve the ability to playback previously recorded user actions, these tools store the GUI object properties in an object map, or some other tool specific artifact. The object map can in turn be referenced when the tool executes the test script and replays the recorded actions. The GUI object properties contain information that the tool requires to uniquely identify GUI objects during script playback. Examples of such object properties include the object class, text, identifier, name, etc.

In one existing approach, every time one or more GUI's of the application user interface (UI) changes, the object map is modified to include the new object properties. For example, modification may be required when the application is migrated from an old version to new version, migrated from one language to another language, when there is a change in the technology of the application's UI, or when there is an application feature change or enhancement. However, with this approach, if the script is to be executed against an older version of the application UI, the changes to the object map will need to be rolled back. If the script is later to be executed against the current version, the changes would have to be reintegrated into the object map. Extra time and effort are required of the tester to maintain the scripts and update the object map every time, resulting in an increase of the overall cost of test execution.

An existing alternative approach is to use descriptive programming instead of using the object map, where a tester can directly call the tool application programming interfaces (API's) to find and modify the desired GUI objects. However, using descriptive programming requires time and special skills.

For example, assume there is an application under development for Company X, and test scripts have been created via the automation test tool to test the application UI. The textual information on a link object on the UI are Company X specific labels. When the same application is customized for Company Y, the same link object is to have Company Y specific labels. If the same scripts recorded to test the Company X customized application are to be used for the Company Y customized application, the properties of the link object has to be updated in the scripts. Once updated, this script can no longer be used to test the Company X customized application. The tester will have to maintain different versions of the script to test the same application.

BRIEF SUMMARY

According to one embodiment of the present invention, a method for storing graphical user interface (GUI) object properties comprises: storing GUI object properties for each GUI object for a starting version of an application in an object map; associating the stored GUI object properties for each GUI object with a starting version identifier; determining that at least one of the GUI objects is changed; in response to determining that the at least one GUI object is changed, storing modifications of the GUI object properties for the at least one GUI object in the object map; and associating the modifications of the GUI object properties for the at least one GUI object with a new version identifier of the application.

In one aspect of the present invention, in response to determining that the at least one GUI object is changed, the storing of the modifications of the GUI object properties for the at least one GUI object in the object map comprises: in response to determining that the at least one GUI object is changed, storing only the modifications of the GUI object properties for the at least one GUI object in the object map without storing the entire GUI object properties.

In one aspect of the present invention, the storing the GUI object properties for each GUI object for the starting version of the application in the object map comprises: storing the GUI object properties for each GUI object for the starting version of the application in a single file with a file name comprising the starting version identifier.

In one aspect of the present invention, in response to determining that the at least one GUI object is changed, the storing of the modifications of the GUI object properties for the at least one GUI object in the object map comprises: storing the modifications of the GUI object properties for the at least one GUI object in a separate file with a file name comprising the new version identifier.

In one aspect of the present invention, in response to determining that the at least one GUI object is changed, the storing of the modifications of the GUI object properties for the at least one GUI object in the object map comprises: storing the modifications of the GUI object properties for the at least one GUI object in the single file with the GUI object properties associated with the starting version of the application.

In one aspect of the present invention, the method further comprises: determining a baseline version of the application to be used in an execution of a test script; retrieving the GUI object properties associated with the starting version of the application from the object map; collecting the GUI object modifications associated with a next version of the application from the object map; merging the collected GUI object modifications with the GUI object properties associated with the starting version of the application; and repeating the collecting of the GUI object modifications associated with the next version of the application from the object map and merging the collected GUI object modifications with the merged GUI object properties until the next version of the application matches the baseline version of the application.

In one aspect of the present invention, the method further comprises: determining that the test script requires interaction with a GUI object of the application; collecting properties of the GUI object of the application; comparing the collected properties of the GUI object of the application with the merged GUI object properties of the GUI object; determining that the collected properties of the GUI object of the application do not match the merged GUI object properties of the GUI object; and in response to determining that the collected properties of the GUI object of the application do not match the merged GUI object properties of the GUI object, moving a baseline version marker to a near version of the application for the GUI object.

System and computer program products corresponding to the above-summarized methods are also described and claimed herein.

DETAILED DESCRIPTION

Figure 1:
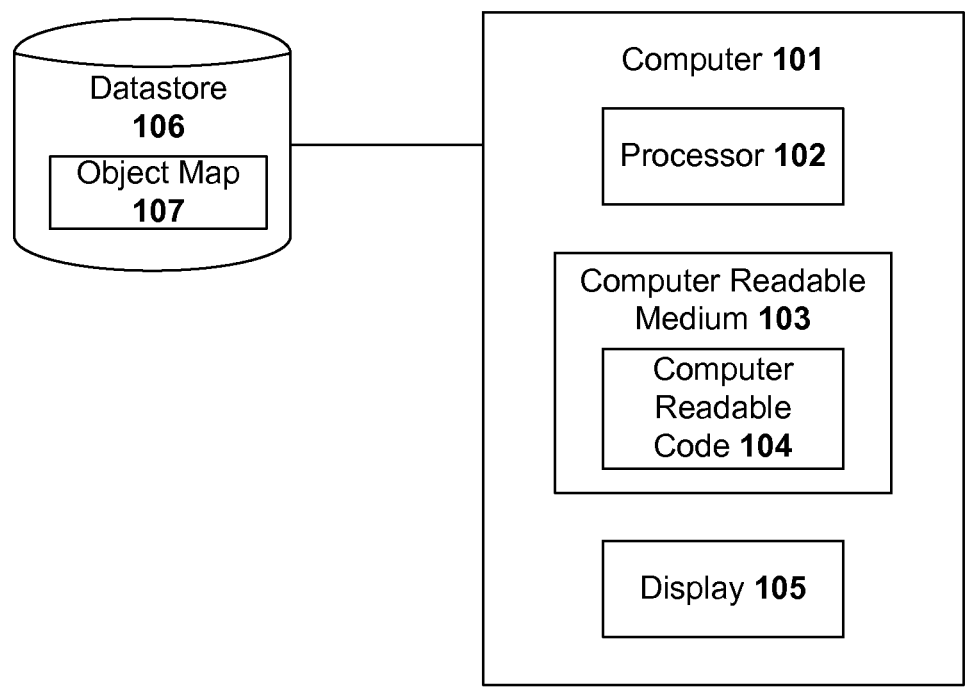
FIG. 1 illustrates an embodiment of a system for GUI object store in automation test tools in accordance with the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an embodiment of a system for GUI object store in automation test tools in accordance with the present invention. The system comprises a computer 101 operationally coupled to a processor 102 and a computer readable medium 103. The computer readable medium 103 stores computer readable program code 104 for implementing the method of the present invention. The computer 101 is operationally coupled to a datastore 106 for storing the object map 107. The processor 102 executes the program code 104 to implement a three-dimensional GUI object store in automation test tools according to the various embodiments of the present invention.

According to an embodiment of the present invention, variants of the properties of the same GUI object are stored in a single object map 107, where each variant of the GUI object properties is associated with a version identifier. The properties of a GUI object comprises the GUI object's place in the hierarchy of the application UP's GUI objects and a set of property-value pairs which the automation test tool would use to recognize the GUI object at the time of test script execution. The version identifier indicates a particular state of the application to which a change in the properties of the GUI object belongs. The state of the application may include a language, locale, a temporary state due to user customization, or any other property variation. The GUI object properties are thus stored in a three-dimensional structure: hierarchy, property-value pairs, and version identifier. In this manner, multiple variants of individual GUI objects are stored in the same object map, making the variants readily accessible to the automation test tool at script execution time.

Figure 2:
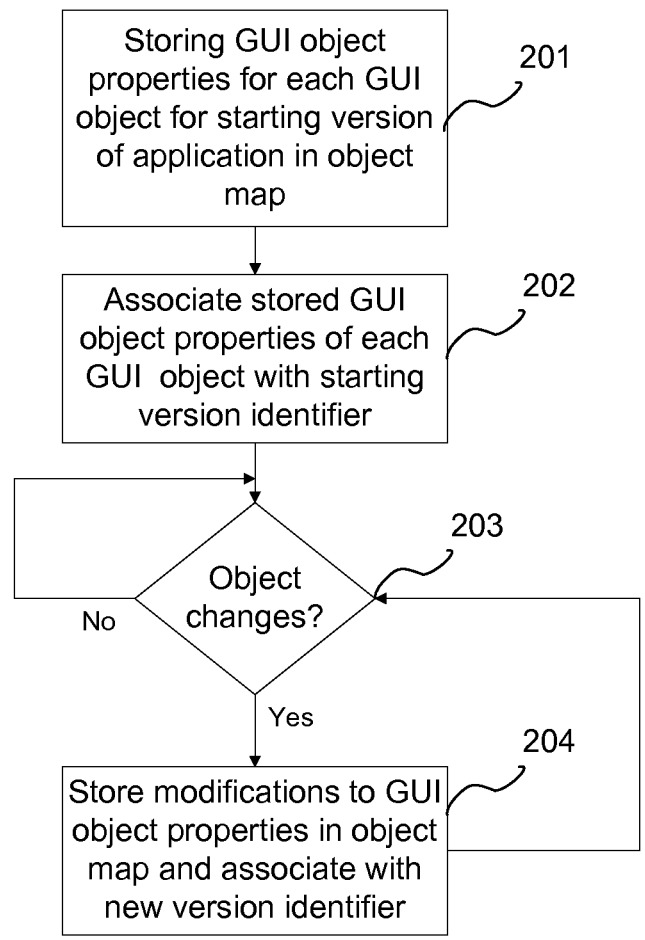
FIG. 2 is a flowchart illustrating an embodiment of a method for storing GUI object properties in accordance with the present invention.

FIG. 2 is a flowchart illustrating an embodiment of a method for storing GUI object properties in accordance with the present invention. For a starting version of the application, the automation test tool records or stores in the object map the GUI object properties for each GUI object in the starting version (201). The GUI object properties for each of the stored GUI objects are associated with a starting version identifier (202). At some later time, the tool determines that at least one of the GUI objects is changed (203). In response to determining that at least one of the GUI object is changed, instead of overwriting the GUI object properties to reflect the change, the tool stores the modifications to the GUI object properties in the object map 107, and associates the modifications with a new version identifier of the application (204). The object map 107 would contain both the GUI object properties associated with the starting version identifier, and the GUI object properties associated with the new version identifier. Steps 203 and 204 are repeated each time a GUI object is changed. In this embodiment, only the modifications to the GUI object properties are stored and associated with the new version identifier, rather than the entire GUI object definition. Further in this embodiment, the GUI object properties and their modifications are stored in the same object map 107. Over time, the object map 107 would contain multiple variants of the GUI objects. The automation test tool may then use this object map 107 to intelligently select the appropriate GUI object version for recognition at script run time, as described in more detail below.

In one implementation of the object map 107 according to the present invention, variants of the GUI object properties are stored in multiple flat files. Each file name would incorporate the version identifier for the corresponding application version. One file stores the details of all of the GUI object properties, i.e., the starting version of the application. The other files store the modifications to the GUI object properties for subsequent versions of the application. In another implementation of the object map according to the present invention, the GUI object properties are stored in one flat file. The starting version of the application, as well as the modifications to the individual GUI object properties for subsequent versions, are stored in the same file. In both implementations, each set of GUI object properties is associated with its respective version identifier. The implementations described above are not intended to be limiting. Any alternative can be implemented.

For example, assume that the starting version of the application includes a button with an "OK" label. A user's interaction with the button is recorded as part of the test script. The tool records the GUI object properties for the button for the starting version of the application (201), and associates with it the starting version identifier (202). Assume that for a subsequent version of the application, the text label for the button is changed to "Cancel" (203). In this case, the modification of the text label for the button to "Cancel" is stored in the object map 107 and associated with a new version identifier (204).

For another example, assume that the hierarchy of the GUI objects changes in the application UI (203). In the case of a removal of a GUI object from the hierarchy, the GUI object properties of the child GUI object of the removed GUI object is stored to point to the parent of the removed GUI object and associated with a new version identifier (204). In the case of an addition of a GUI object into the hierarchy, the GUI object properties of the new GUI object is stored to point to its parent GUI object and associated with a new version identifier (204). The GUI object properties of the child of the new GUI object is modified to point to the new GUI object as its parent. This modification is stored in the object map and associated with the version identifier (204).

Figure 3:
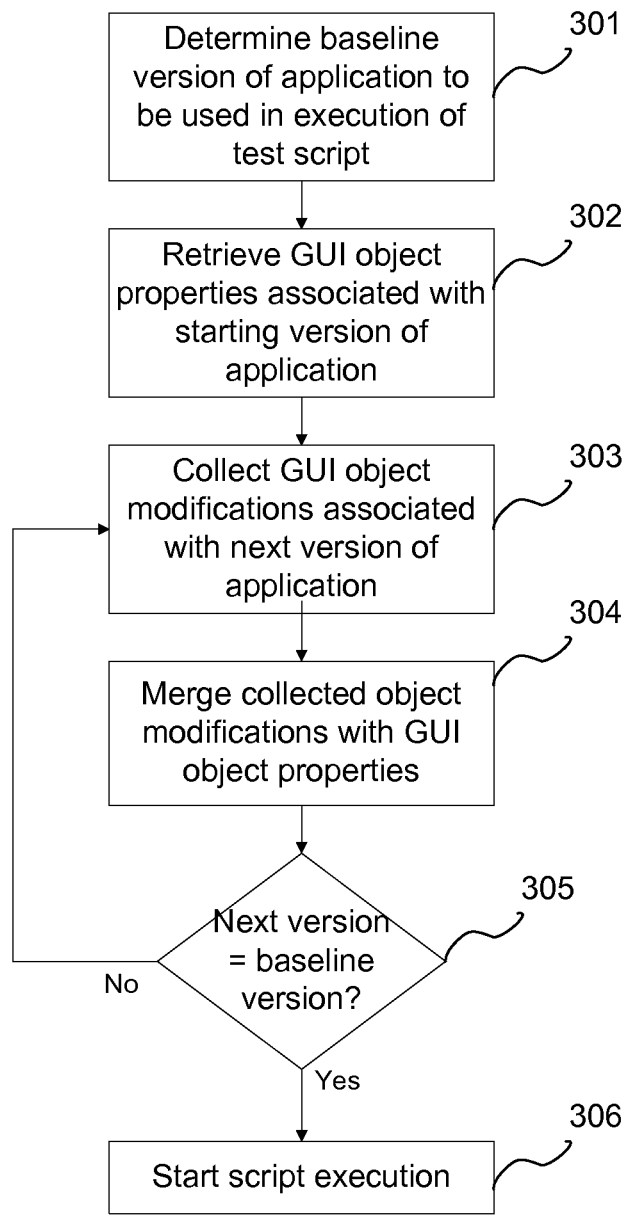
FIG. 3 is a flowchart illustrating an embodiment of a method for dynamically obtaining a GUI object properties for a version of an application in accordance with the present invention.

FIG. 3 is a flowchart illustrating an embodiment of a method for dynamically obtaining a GUI object properties for a version of an application in accordance with the present invention. Before starting script execution, the automation test tool determines the baseline version of the application to be used in the script execution (301). The baseline version may be determined through an input of a baseline version identifier by the tester or obtained through configuration settings. For example, absent a baseline version identifier input from the tester, the tool may set the latest version as the baseline version of the application. Once the baseline version is determined, the tool retrieves the GUI object properties associated with the starting version of the application from the object map 107 (302), stored per steps 201-202 of FIG. 2. Then, using the version identifiers associated with the GUI properties, the tool collects the GUI object modifications associated with the next version of the application from the object map 107 (303), and merges the collected object modifications with the GUI object properties (304). If the next version is not the baseline version (305), then steps 303-304 are repeated for a subsequent version of the application. If the next version is the baseline version (305), then the merging of the modifications to the GUI object properties is complete, and the execution of the script may then be started with the merged GUI object properties (306).

To retrieve GUI object properties for a different version of the application, the version identifier for this version of the application may be provided as the baseline version identifier, either through tester input or through configuration settings. The modifications of the GUI object properties are then merged in the same manner as described above.

Figure 4:
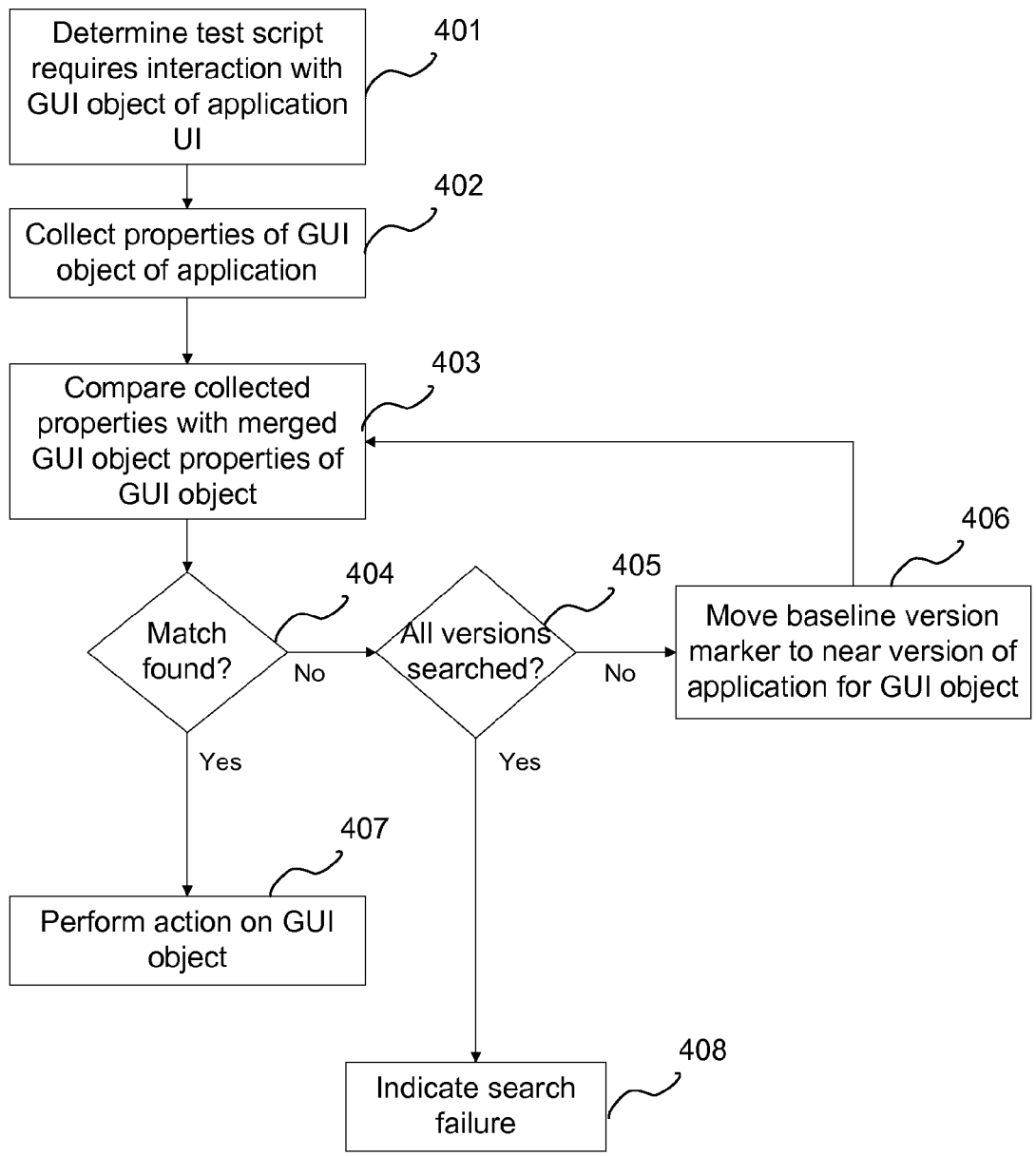
FIG. 4 is a flowchart illustrating an embodiment of a method for dynamically obtaining GUI object properties for a version of an application when merged GUI object properties are insufficient to search on application.

FIG. 4 is a flowchart illustrating an embodiment of a method for dynamically obtaining GUI object properties for a version of an application when merged GUI object properties are insufficient to search on application. After the merging of the object modifications as described above, the execution of the test script may be started. During the replay of the test script, the tool determines that the test script requires interaction with a GUI object of the application UI (401). The tool collects the properties of the GUI object of the application (402), and the tool compares the collected GUI object properties with the merged GUI object properties of the GUI object (403). Here, the merged GUI object properties of the GUI object corresponds to the baseline version of the application. In response to finding a match, the action is performed on the GUI object (407). In response to not finding a match (404), and determining that the GUI object properties for all application versions have not been searched (405), the tool moves the baseline version marker to a near version of the application for the GUI object (406). The tool then compares the collected properties with the merged GUI object properties of the GUI object of this baseline version (403). For example, if no match is found and the baseline version is $V_n$, the tool can be configured to dynamically move the baseline version marker to the next nearest version (either $V_{n+1}$ of $V_{n-1}$) and use the corresponding GUI object properties for that version of the application. Steps 403-406 are repeated until the tool finds a match. In response to finding no match after all the application versions have been searched (405), a search failure is indicated (408). In this manner, the tool may be configured to automatically move forward and backward among different variants of the same GUI object and select the best matching GUI object. The linear search for an appropriate variant of the GUI object may be done using any suitable algorithm, such as breadth first search and depth first search. When the versioning in the object map is not linear, for example, when the versions have a tree form, then non-linear search algorithms may be used.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer implemented method for obtaining graphical user interface (GUI) object properties, comprising:
   prior to an execution of a test script:
      determining a baseline version identifier for a baseline version of an application to be used in the execution of the test script, the baseline version being later than a starting version of the application and earlier than a latest version of the application;
      retrieving GUI object properties associated with a starting version identifier for the starting version of the application from an object map, the object map storing:
         GUI object properties for each GUI object for the starting version of the application, the GUI object properties for the starting version being associated with the starting version identifier; and
         modifications of the GUI object properties for at least one GUI object for a plurality of versions of the application subsequent to the starting version, the GUI object properties for each given version being associated with a given version identifier for the given version of the application;
      collecting the GUI object modifications associated with a next version identifier from the object map;
      merging the collected GUI object modifications with the GUI object properties associated with the starting version identifier; and
      repeating the collecting of the GUI object modifications associated with the next version identifier from the object map and merging the collected GUI object modifications with the merged GUI object properties until the next version identifier matches the baseline version identifier.

2. The method of claim 1, further comprising:
   storing the GUI object properties for each GUI object for the starting version of the application in the object map;
   associating the stored GUI object properties for each GUI object with for the starting version the starting version identifier;
   determining that at least one of the GUI objects of the starting version is changed for the given version of the application;
   in response to determining that the at least one GUI object for the starting version is changed for the given version, storing modifications of the GUI object properties for the at least one GUI object for the given version in the object map; and associating the modifications of the GUI object properties for the at least one GUI object for the given version with the given version identifier.

3. The method of claim 2, wherein in response to determining that the at least one GUI object for the starting version is changed for the given version, the storing of the modifications of the GUI object properties for the at least one GUI object for the given version in the object map comprises:
in response to determining that the at least one GUI object for the starting version is changed for the given version, storing only the modifications of the GUI object properties for the at least one GUI object for the given version in the object map without storing the entire GUI object properties.

4. The method of claim 2, wherein the storing the GUI object properties for each GUI object for the starting version of the application in the object map comprises:
storing the GUI object properties for each GUI object for the starting version of the application in a single file with a file name comprising the starting version identifier.

5. The method of claim 4, wherein in response to determining that the at least one GUI object for the starting version is changed for the given version, the storing of the modifications of the GUI object properties for the at least one GUI object for the given version in the object map comprises:
storing the modifications of the GUI object properties for the at least one GUI object for the given version in a separate file with a file name comprising the given version identifier.

6. The method of claim 4, wherein in response to determining that the at least one GUI object for the starting version is changed for the given version, the storing of the modifications of the GUI object properties for the at least one GUI object for the given version in the object map comprises:
storing the modifications of the GUI object properties for the at least one GUI object for the given version in the single file with the GUI object properties associated with the starting version of the application.

7. The method of claim 1, further comprising:
determining that the test script requires interaction with a GUI object of the baseline version of the application;
collecting properties of the GUI object of the baseline version of the application;
comparing the collected properties of the GUI object of the baseline version of the application with the merged GUI object properties of the GUI object;
determining that the collected properties of the GUI object of the baseline version of the application do not match the merged GUI object properties of the GUI object; and
in response to determining that the collected properties of the GUI object of the baseline version of the application do not match the merged GUI object properties of the GUI object, moving a baseline version marker to a near version of the application for the GUI object.

8. The method of claim 1, further comprising:
executing the test script to test the baseline version of the application using the merged GUI object properties.

9. A computer implemented method for storing graphical user interface (GUI) object properties, comprising:
storing GUI object properties for each GUI object for a starting version of an application in an object map;
associating the stored GUI object properties for each GUI object with a starting version identifier;
determining that at least one of the GUI objects is changed;
in response to determining that the at least one GUI object is changed, storing modifications of the GUI object properties for the at least one GUI object in the object map;
associating the modifications of the GUI object properties for the at least one GUI object with a new version identifier of the application;
determining a baseline version of the application to be used in an execution of a test script;
retrieving the GUI object properties associated with the starting version of the application from the object map;
collecting the GUI object modifications associated with a next version of the application from the object map;
merging the collected GUI object modifications with the GUI object properties associated with the starting version of the application;
repeating the collecting of the GUI object modifications associated with the next version of the application from the object map and merging the collected GUI object modifications with the merged GUI object properties until the next version of the application matches the baseline version of the application;
determining that the test script requires interaction with a GUI object of the application;
collecting properties of the GUI object of the application;
comparing the collected properties of the GUI object of the application with the merged GUI object properties of the GUI object;
determining that the collected properties of the GUI object of the application do not match the merged GUI object properties of the GUI object; and
in response to determining that the collected properties of the GUI object of the application do not match the merged GUI object properties of the GUI object, moving a baseline version marker to a near version of the application for the GUI object.

* * * * *